United States Patent
Fu

(10) Patent No.: US 10,286,951 B2
(45) Date of Patent: May 14, 2019

(54) METHOD AND DEVICE FOR MONITORING A STEERING ACTION OF A DRIVER OF A VEHICLE

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 5 days.

(21) Appl. No.: 15/547,342

(22) PCT Filed: Jan. 15, 2016

(86) PCT No.: PCT/EP2016/050800
§ 371 (c)(1),
(2) Date: Jul. 28, 2017

(87) PCT Pub. No.: WO2016/128174
PCT Pub. Date: Aug. 18, 2016

(65) Prior Publication Data
US 2018/0022385 A1    Jan. 25, 2018

(30) Foreign Application Priority Data

Feb. 11, 2015    (DE) .................. 10 2015 202 433

(51) Int. Cl.
*B62D 15/02*    (2006.01)
*B62D 1/28*    (2006.01)
(Continued)

(52) U.S. Cl.
CPC .......... *B62D 15/025* (2013.01); *B60W 10/20* (2013.01); *B60W 30/12* (2013.01); *B62D 1/286* (2013.01);
(Continued)

(58) Field of Classification Search
CPC ....... B60W 10/20; B60W 30/12; B62D 1/286; B62D 15/025; B62D 5/0463; B60T 2201/086
See application file for complete search history.

(56) References Cited

U.S. PATENT DOCUMENTS

| | | | | |
|---|---|---|---|---|
| 2002/0177935 A1* | 11/2002 | Winner | ............... | B60K 31/0008 701/93 |
| 2003/0168275 A1* | 9/2003 | Sakugawa | .............. | B62D 5/008 180/402 |
| 2016/0069317 A1* | 3/2016 | Koibuchi | ............ | F02N 11/0833 701/112 |

FOREIGN PATENT DOCUMENTS

| | | |
|---|---|---|
| DE | 10114470 A1 | 9/2002 |
| EP | 1602552 A2 | 12/2005 |

(Continued)

OTHER PUBLICATIONS

Fujita, English Translation for reference WO2014073079A1, May 2014.*

(Continued)

*Primary Examiner* — Rachid Bendidi
(74) *Attorney, Agent, or Firm* — Norton Rose Fulbright US LLP; Gerard Messina

(57) ABSTRACT

A method for monitoring a steering action of a driver of a vehicle. The method includes exerting an automated steering torque on a steering system of the vehicle, reducing the automated steering torque and detecting a movement of the steering system and/or a force of the steering system and/or a lateral movement of the vehicle in response to the reduction of the automated steering torque, to monitor the steering action of the driver.

10 Claims, 2 Drawing Sheets

(51) Int. Cl.
*B60W 10/20* (2006.01)
*B60W 30/12* (2006.01)
*B62D 5/04* (2006.01)
(52) U.S. Cl.
CPC ...... *B62D 5/0463* (2013.01); *B60T 2201/086* (2013.01)

(56) References Cited

FOREIGN PATENT DOCUMENTS

| WO | 2014073079 A1 | 5/2014 | |
|---|---|---|---|
| WO | WO-2014073079 A1 * | 5/2014 | ............. B62D 6/002 |

OTHER PUBLICATIONS

International Search Report for PCT/EP2016/050800, dated Mar. 22, 2016.

* cited by examiner

METHOD AND DEVICE FOR MONITORING A STEERING ACTION OF A DRIVER OF A VEHICLE

FIELD OF THE INVENTION

The present invention relates to a method for monitoring a steering action of a driver of a vehicle, to a corresponding device and to a corresponding computer program.

BACKGROUND INFORMATION

The lane keeping assist function integrated in the vehicle or the LKA system (Lane Keeping Assist System), in short LKAS, may assist the driver in the lateral guidance of the vehicle. In the center guidance mode of the lane keeping assist system, the LKAS function primarily steers and keeps the vehicle in the center of the lane. In terms of control technology, the driver does not even have to steer. For safety reasons, however, the driver must keep the hands on the steering wheel. In addition, autonomous driving pursuant to the Vienna Convention is presently not yet legally permitted in most countries of the world.

Therefore, a so-called hands-off detection is presently carried out in vehicles which include the LKAS function (in particular, including center guidance mode), in which it is checked whether or not the driver has the hands on the steering wheel. If the driver is not holding the steering wheel, a warning is issued and the steering assist is switched off. For the hands-off detection, the comparison of the measured steering wheel torque with a threshold is related art. If the measured steering wheel torque is too low for a long period of time, for example, more than 15 seconds, hands-off is recognized.

SUMMARY OF THE INVENTION

Against this background, with the approach presented herein, a method for monitoring a steering action of a driver of a vehicle, furthermore a device, which uses this method, and finally a corresponding computer program according to the main claims is presented. Advantageous embodiments result from the respective subclaims and from the following description.

With a reduction of an automated steering torque of a vehicle and subsequent detection of a movement of the steering system caused by the driver and/or a force of the steering system, it is possible to rapidly and reliably check whether or not the driver is holding the steering wheel.

According to the approach presented herein, it is possible to recognize more reliably both a "hands-off," i.e., no holding of the steering wheel, as well as a "hands-on," holding of the steering wheel. Thus, it may be ensured on the one hand that the driver is less disturbed by false warnings. On the other hand, the actual "hands-off" driving may be better recognized.

A method is presented for monitoring a steering action of a driver of a vehicle, the method including the following steps:
exerting an automated steering torque on a steering system of the vehicle;
reducing the automated steering torque; and
detecting a movement of the steering system and/or a force of the steering system and/or a lateral movement of the vehicle in response to the reduction of the automated steering torque, in order to monitor the steering action of the driver.

The steering action may be understood to mean an actuation or touching of the steering wheel by the hands of the driver of the vehicle. The automated steering torque may be effectuated by a lane keeping assist system of the vehicle and an automatic center guidance of the vehicle in a predefined traffic lane may be ensured. The reduction of the automated steering torque may cause a gentle drifting of the vehicle away from the center guidance. The movement of the steering system or the force of the steering system or the lateral movement of the vehicle may be understood as being caused by the hands of the driver. The lateral movement of the vehicle may be understood to mean a sideways movement of the vehicle in relation to a principle driving direction of the vehicle. With the lateral movement, a distance to the side lane boundary on the roadway may change, i.e. become greater or smaller. The aim of the force or of the movement of the steering system or of the vehicle may be, in particular, to prevent the vehicle from drifting from the center of a traffic lane or from an optimal crosshead travel by an active turning of the steering wheel of the vehicle by the driver.

According to one specific embodiment of the method, the automated steering torque may be reduced in the step of reducing using a piece of information about a suspected non-touching of a steering wheel of the vehicle by the hands of the driver. Thus, it may be advantageously ensured that the automated steering torque is reduced only when needed.

The method may also include a step of forming the information about a suspected non-touching of a steering wheel of the vehicle by the hands of the driver. The information in this case may be formed if an active steering torque executed by the driver is below a predefined threshold value over the duration of a predetermined time interval. With this specific embodiment, it is possible to verify with a high degree of probability whether there is the risk that the driver does not have the hands on the steering wheel.

According to one particularly advantageous specific embodiment of the approach presented herein, the lateral movement of the vehicle may be detected in the step of detecting using a signal of a camera of the vehicle and/or a signal of a lane keeping system. Such a specific embodiment of the approach presented herein offers the advantage of utilizing already existing components of the vehicle, so that a high, additional increase in safety may be achieved with little effort by a simple modification of the evaluation algorithms.

In the step of reducing, for example, the automated steering torque may be reduced in a first reducing interval to a predetermined first target value, and to a predetermined second target value in a second reducing interval. In this case, the predetermined second target value may be below the predetermined first target value. The second reducing interval may, in particular, follow chronologically the first reducing interval. Thus, it may be advantageously prevented that the reduction of the automated steering torque startles the driver and induces the driver into an excessive countersteering.

According to another specific embodiment, the method may include a step of providing a warning signal with respect to a suspected non-touching of a steering wheel of the vehicle by the hands of the driver to an output unit of the vehicle. The warning signal may be provided if in the step of detecting, the movement of the steering system and/or the force of the steering system and/or the lateral movement of the vehicle meets a predetermined criterion. The predetermined criterion may be an undershooting of a predetermined minimum torque of the steering wheel or a predetermined minimum torsional force by the steering system. The predetermined criterion may also be an undershooting of a minimum distance to the side lane boundary. The monitoring of the predetermined criterion in terms of a torque or a force of the steering system may, for example, be charged to the lane keeping assist system. The lateral movement of the vehicle, in particular, may be detected by a lane recognition device of the vehicle with the aid of a vehicle camera. By providing the warning signal, for example, to trigger a warning sound in the vehicle, the driver may be reliably instructed to place the hands on the steering wheel.

In the step of providing, for example, the warning signal may be provided if in the step of detecting, the movement of the steering system and/or the force of the steering system and/or the lateral movement of the vehicle meets the predetermined criterion following a predetermined time period after the second reducing interval. With this specific embodiment, the driver may be readily provided with a sufficient reaction time for the steering action.

It is also favorable if the method includes a step of increasing the automated steering torque, if in the step of providing the warning signal has been provided. In this way, it is possible to advantageously reestablish or improve the lane keeping of the vehicle after a warning to the driver has occurred.

According to another specific embodiment, the method may include a step of deactivating the automated steering torque if, following a predetermined time period after the step of providing the warning signal, the movement of the steering system and/or the force of the steering system and/or the lateral movement of the vehicle continues to meet the predetermined criterion in the step of detecting. Thus, it may be advantageously ensured that the driver is forced to grasp the steering wheel for a required steering action after a reasonable reaction time limit has elapsed.

The method may also include a step of increasing the automated steering torque if, in the step of detecting following a predetermined time period after the first reducing interval, the movement of the steering system and/or the force of the steering system and/or the lateral movement of the vehicle meets another predetermined criterion. This specific embodiment of the method permits what may be a rapid reestablishment of the full functioning of the lane keeping assist system, once it has been determined that the driver has (again) performed his/her vehicle control task.

A device for monitoring a steering action of a driver of a vehicle is presented, the device including the following features:
an exertion unit for exerting an automated steering torque on a steering system of the vehicle;
a reducing unit for reducing the automated steering torque; and
a detection unit for detecting a movement of the steering system and/or a force of the steering system and/or a lateral movement of the vehicle in response to the reduction of the automated steering torque, in order to monitor the steering action of the driver.

The device is configured to carry out, control or implement the steps of a variant of the method presented herein in its corresponding units. With this specific embodiment variant of the present invention in the form of a device as well, it is possible to rapidly and efficiently achieve the object underlying the present invention.

A device in the present case may be understood to mean an electrical device, which processes sensor signals and which outputs control signals and/or data signals as a function thereof. The device may include an interface, which may be configured in hardware and/or in software. In a hardware design, the interfaces may, for example, be part of a so-called system ASIC, which includes a wide variety of functions of the device. It is also possible, however, that the interfaces are dedicated, integrated circuits or are made up at least partially of discrete elements. In a software design, the interfaces may be software modules, which are present on a microcontroller, for example, in addition to other software modules.

Also advantageous is a computer program product or computer program including program code, which may be stored on a machine-readable medium or memory medium, such as a semiconductor memory, a hard disk memory or an optical memory, and which is used for carrying out, implementing and/or controlling the steps of the method according to one of the previously described specific embodiments, in particular, when the program product or program is executed on a computer or a device.

The approach presented herein is explained by way of example in greater detail below with reference to the appended drawings.

DETAILED DESCRIPTION

Figure 1:
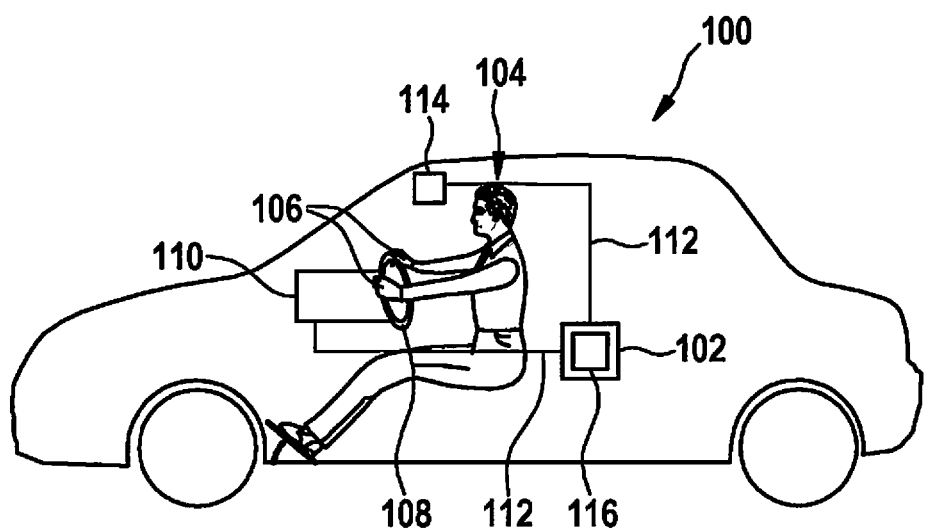
FIG. 1 shows a schematic diagram of a vehicle including a lane keeping assist system according to one exemplary embodiment of the present invention.

In the following description of exemplary embodiments of the present invention, identical or similar reference numerals are used for elements which are represented in the various figures and act similarly, a repeated description of these elements being omitted.

FIG. 1 shows a schematic diagram of a vehicle 100 including a lane keeping assist system or LKA system 102 according to one exemplary embodiment of the present invention. Vehicle 100 is a road vehicle, here a passenger car. A driver 104 of vehicle 100 is holding a steering wheel 108 of vehicle 100 with hands 106. Steering wheel 108 is coupled to a steering system 110 of vehicle 100. Lane keeping assist system 102 is electrically connected to steering system 110 via a wiring system 112 of vehicle 100, for example, a CAN bus.

LKA system 102 shown by way of example in FIG. 1 includes a center guidance mode, with which vehicle 100 is held in the center of a traffic lane to be driven by vehicle 100 with the aid of an exertion of suitable automatic steering torques without or with only minimal assistance of driver 104. For this purpose, lane keeping assist system 102 is also electrically connected via wiring system 112 to a vehicle camera 114 mounted behind the windshield of vehicle 100.

In the exemplary embodiment shown in FIG. 1, lane keeping assist system 102 is activated and assists driver 104 in steering vehicle 100. In the process, LKA system 102 ascertains a course of the traffic lane lying ahead of vehicle 100 via camera 114. Based on the detected image data, LKA system 102 then ascertains an optimal steering angle in order to keep vehicle 100 in the center of the traffic lane. The steering angle is a combination of 20% human input and 80% input of lane keeping assist system 102. A steering wheel torque sensor on steering wheel 108 connected to lane keeping assist system 102 or to steering system 110 measures the active steering movements contributed by driver 104 to the lane keeping.

A lateral movement of the vehicle with respect to the center guidance is also observed via camera 114. For this purpose, camera 114 may detect changes in the distance of vehicle 100 to side lane boundaries. In this way also, it is possible to continuously monitor and regulate the lane keeping by the lane keeping assist system 102 continuously ensuring the maintenance of a suitable distance of vehicle 100 to the left and/or right lane boundary.

Even in the case of lane keeping assist system 102, driver 104 is required to keep both hands 106 on steering wheel 108 as depicted in FIG. 1, even if active steering movements by driver 104 are not required due to lane keeping assist system 102. Thus, in conjunction with the utilization of lane keeping assist system 102, it is important that so-called "hands-off-driving," in which driver 104 does not have hands 106 on steering wheel 108, may be rapidly recognized and a corresponding warning, for example, a warning sound, is output in vehicle 100 in order to remind driver 104 to take steering wheel 108 back into hands 106.

Depending on the route to be driven, the detection of "hands-off" or "hands-on" may become difficult or unreliable. Thus, for example, the steering wheel torque measured by the steering wheel torque sensor may be very low if driver 104 only very lightly touches steering wheel 108, for example, on a relatively straight, level, flat and smooth roadway. Unjustifiable signaling of a "hands-off" to driver 104 is to be avoided in such a case.

A second problem may be that during the debouncing time for the signal of the steering wheel torque sensor, "hands-off" is not reliably recognized, even though driver 104 in fact does not have hands 106 on steering wheel 108. The cause of this may lie with, among other things, the mechanics of steering system 110 and the suspension of vehicle 100. Thus, it may occur that vibrations generated by unevennesses in the roadway have an effect on steering system 110 and the steering wheel torque sensor measures a low steering wheel torque, even though driver 104 is not steering. One possible remedy would be to increase the debouncing time. This is possible only to a limited degree, however, since the time period for "hands-off driving" may be kept short.

To remove the cited uncertainties, LKA system 102 shown by way of example in FIG. 1 includes a device 116 for monitoring a steering action of driver 104. This device 116 and the corresponding method carried out by it is discussed in greater detail below.

Figure 2:
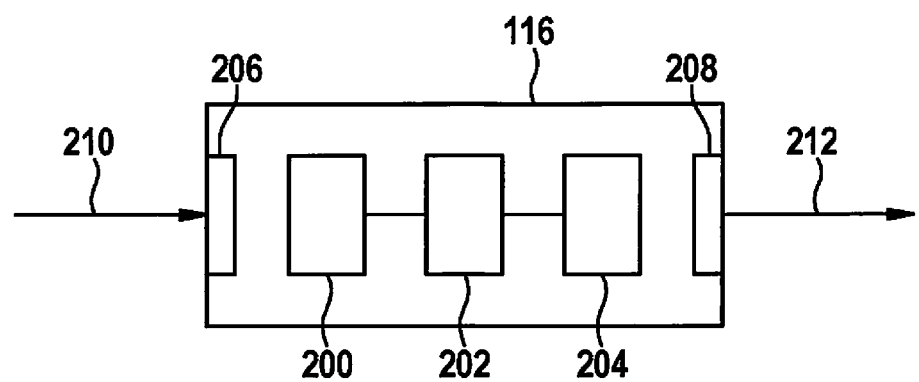
FIG. 2 shows a block diagram of a device for monitoring a steering action of a driver of a vehicle according to one exemplary embodiment of the present invention.

FIG. 2 shows a block diagram of one exemplary embodiment of device 116 for monitoring a steering action of a driver of a vehicle from FIG. 1. Device 116 includes an exertion unit 200, a reducing unit 202, a detection unit 204, an input interface 206 and an output interface 208.

Exertion unit 200 is configured to exert an automated steering torque on the steering system of the vehicle. Input interface 206 is configured to read in a piece of information 210 about a suspected non-touching of the steering wheel of the vehicle by the hands of the driver. According to one exemplary embodiment, piece of information 210 about the suspected non-touching of the steering wheel is formed when an active steering torque executed by the driver is below a predetermined threshold value over the duration of a predetermined time interval, for example, 15 seconds.

Reducing unit 202 is configured to reduce the automated steering torque using piece of information 210 about the suspected non-touching of the steering wheel. According to one exemplary embodiment, the reduction of the automated steering torque may take place incrementally. A gradual deviation of the vehicle from the lane center guidance is caused by the reduction of the automated steering torque, which requires an active counter-steering by the driver of the vehicle in order to return the vehicle to center guidance.

Detection unit 204 is configured to detect whether or not, according to one exemplary embodiment, a predetermined movement of the steering system and/or a predetermined force of the steering system is present in response to the reduction of the automated steering torque, for example, using signals of the steering wheel torque sensor of the vehicle. Alternatively or in addition, detection unit 204 is configured to detect whether or not a lateral movement of the vehicle is present. For this purpose, detection unit 204 may be coupled to a vehicle camera of the vehicle. In this way, it is recognized whether the driver keeps the hands on the steering wheel in order to carry out the steering movement necessitated by the reduction of the automated steering torque.

If the movement of the steering system and/or force of the steering system and/or the detected lateral movement of the vehicle detected by detection unit 204 meets a predetermined criterion, a warning signal 212 is provided via output interface 208 to a suitable output unit of the vehicle.

According to exemplary embodiments, the criterion may be an undershooting of a predetermined signal threshold value by the signals supplied by the steering torque sensor. According to other exemplary embodiments, the criterion may be an exceedance of a maximum deviation value of a permissible deviation of a suitable distance of the vehicle from a side lane boundary.

In response to the warning signal 212, for example, an alarm sound is output over an interior loudspeaker of the vehicle, in order to instruct the driver to take the steering wheel into the hands again.

Figure 3:
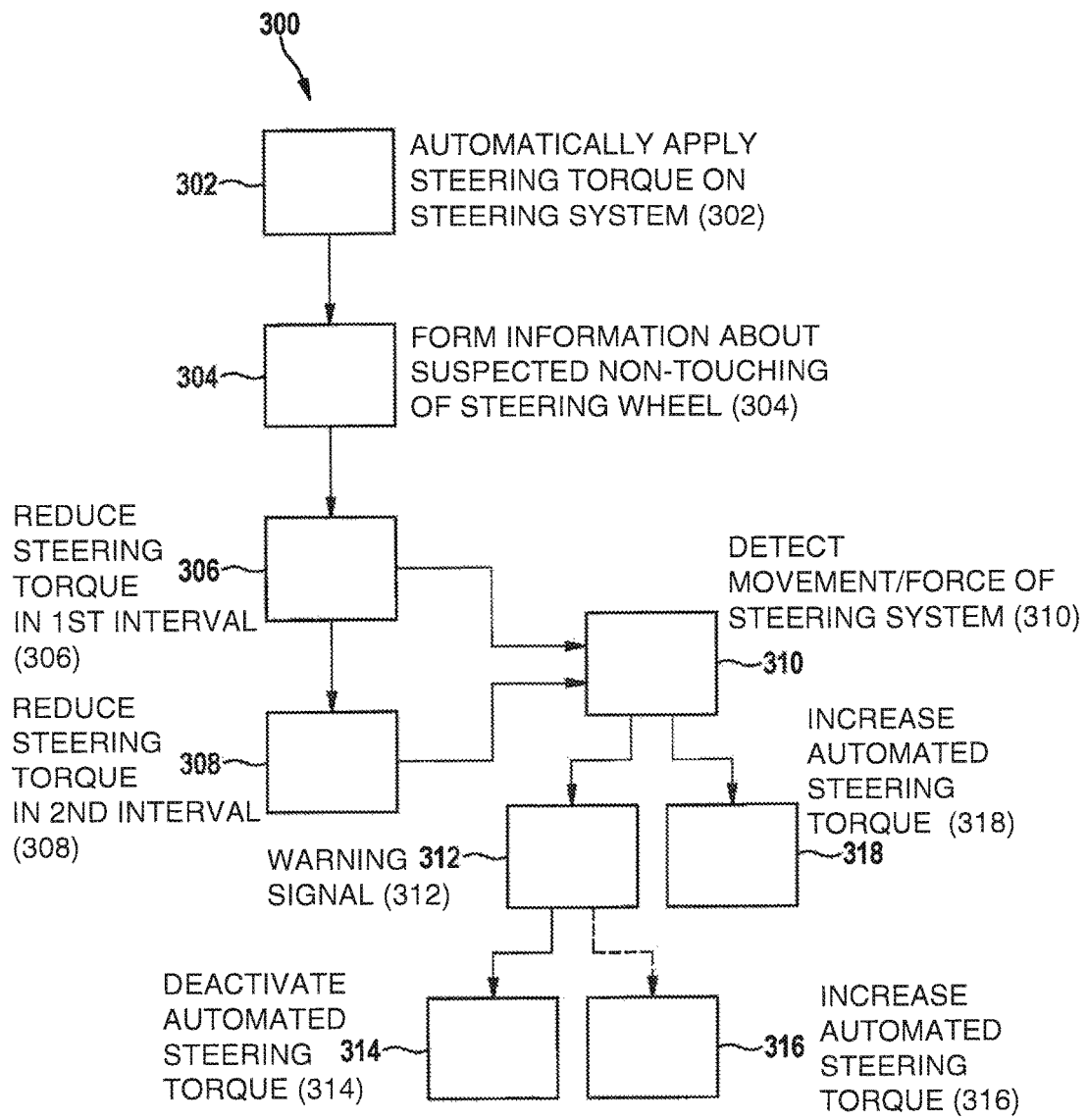
FIG. 3 shows a flow chart of a method for monitoring a steering action of a driver of a vehicle according to one exemplary embodiment of the present invention.

FIG. 3 shows a flow chart of an exemplary embodiment of a method 300 for monitoring a steering action of a driver of a vehicle. Method 300 may be carried out by device 116 presented in FIGS. 1 and 2.

In a step 302, an automated steering torque is exerted on a steering system of the vehicle.

In a step 304, a piece of information is formed about a suspected non-touching of a steering wheel of the vehicle by the hands of the driver, if an active steering torque executed by the driver is below a predetermined threshold value over the duration of a predetermined time interval.

In a step 306, the automated steering torque is reduced in a first reduction interval to a predetermined first target value using the piece of information about a suspected non-touching of the steering wheel of the vehicle by the hands of the driver.

In a subsequent step 308, after the elapse of the first reducing interval, the automated steering torque is reduced in a second reducing interval going beyond the predetermined first target value to a predetermined second target value.

In a step 310, a movement of the steering system and/or a force of the steering system and/or a lateral movement of the vehicle is detected in response to the reduction of the automated steering torque in step 306 and/or in step 308, in order to monitor the steering action of the driver.

If in step 310 of detecting, the movement of the steering system and/or the force of the steering system and/or the lateral movement of the vehicle meets a predetermined criterion following a predetermined time period after the second reducing interval, a warning signal with respect to a suspected non-touching of the steering wheel of the vehicle by the hands of the driver is provided in a step 312 to an output unit of the vehicle. The predetermined criterion according to exemplary embodiments of method 300 may be an undershooting of a threshold value for an active steering torque by the driver.

If, following a predetermined time period after step 312 of providing the warning signal, the movement of the steering system and/or the force of the steering system and/or the lateral movement of the vehicle continues to meet the predetermined criterion, the automated steering torque is deactivated in a step 314.

According to one alternative exemplary embodiment of method 300, instead of step 314, a step 316, is carried out following step 312, in which the automated steering torque is increased again.

According to one alternative exemplary embodiment of method 300, step 316 is always carried out and before step 314, a suitable time interval being provided between steps 316 and 314 for a reasonable reaction time of the driver.

If, alternatively, in step 310 of detecting, the movement of the steering system and/or the force of the steering system and/or the lateral movement of the vehicle meets a further predetermined criterion following a predetermined time period after the first reducing interval, the automated steering torque is increased in a step 318 by a predetermined value, for example, the automated steering torque is reset to the original value. The further predetermined criterion according to exemplary embodiments of method 300 may be an exceedance of a threshold value for an active steering torque by the driver.

Method 300 in its various exemplary embodiments offers an improved method of "hands-off detection" based on the combined detection of a reaction of the driver and a traffic lane recognition.

For a reliable recognition of "hands-off," the LKA torque is gently reduced in steps 306 and 308 according to method 300 in the case of suspected "hands-off situations," if the measured steering wheel torque is very low for several seconds. The reduction does not occur abruptly, but rather gradually in order not to startle the driver. Nor is the torque reduced to zero, but rather initially to a certain target value. If the driver now does not steer concurrently, the vehicle will slowly drift from the center of the lane. In the event the vehicle drifts too far away from the center of the lane, which may be detected according to exemplary embodiments with the aid of the lane recognition integrated in the vehicle, it may be assumed with a degree of likelihood bordering on certainty that the driver is not steering concurrently. Accordingly, a "hands-off warning" is immediately output in step 312.

According to exemplary embodiments of method 300, the amount of LKA torque may be maintained. Alternatively, however, the LKA torque according to step 316 may be initially "ramped" up or increased in order to prevent a further drifting of the vehicle. In the event the driver then does not respond quickly enough to the warning, the LKA torque is finally switched off in step 314. If, on the other hand, the driver steers concurrently, the vehicle will not deviate significantly from the center of the lane and a sufficient steering torque may be detected again. In this case, the reduction of the LKA torque is eliminated again in step 318.

The exemplary embodiments described and shown in the figures are selected only by way of example. Different exemplary embodiments may be combined completely with one another or only with respect to individual features. One exemplary embodiment may also be supplemented by features of another exemplary embodiment.

In addition, the method steps presented herein may be repeated and carried out in a sequence other than that described.

If an exemplary embodiment includes an "and/or" linkage between a first feature and a second feature, this is to be read in the sense that the exemplary embodiment according to one specific embodiment includes both the first feature and the second feature, and according to another specific embodiment, either only the first feature or only the second feature.

What is claimed is:

1. A method for monitoring a steering action of a driver of a vehicle, the method comprising:
   applying, via a torque applying unit, an automated steering torque on a steering system of the vehicle;
   reducing, via a torque reducing unit, the automated steering torque, wherein in the reducing, the automated steering torque is reduced by hands of the driver using a piece of information about a suspected non-touching of a steering wheel of the vehicle;
   detecting, via a detection unit, at least one of: a movement of the steering system, a force of the steering system, and a lateral movement of the vehicle in response to the reduction of the automated steering torque, so as to monitor the steering action of the driver; and
   forming the piece of information about the suspected non-touching of the steering wheel of the vehicle by the hands of the driver, the piece of information being formed when an active steering torque executed by the driver is below a predetermined threshold value over the duration of a predetermined time interval;
   wherein in the reducing, the automated steering torque is reduced in a first reducing interval to a predetermined first target value and to a predetermined second target value in a second reducing interval, the predetermined second target value falling below the predetermined first target value.

2. The method of claim 1, wherein in the detecting, the lateral movement of the vehicle is detected using at least one of a signal of a camera of the vehicle and a signal of a lane keeping system.

3. The method of claim 1, further comprising:
   providing a warning signal with respect to a suspected non-touching of a steering wheel of the vehicle by hands of the driver to an output unit of the vehicle, when in the detecting, at least one of the movement of the steering system, the force of the steering system, and the lateral movement of the vehicle meets a predetermined criterion.

4. The method of claim 3, wherein in the providing, the warning signal is provided when in the detecting, at least one of the movement of the steering system, the force of the steering system, and the lateral movement of the vehicle meets the predetermined criterion following a predetermined time period after the second reducing interval.

5. The method of claim 4, further comprising:
   increasing the automated steering torque if, in the providing, the warning signal has been provided.

6. The method of claim 3, further comprising:
   deactivating the automated steering torque when, following a predetermined time period after the providing of the warning signal, at least one of the movement of the steering system, the force of the steering system, and the lateral movement of the vehicle continues to meet the predetermined criterion in the detecting.

7. The method of claim 1, further comprising:
raising the automated steering torque when, in the detecting, following a predetermined time period after the first reducing interval, at least one of the movement of the steering system, the force of the steering system, and the lateral movement of the vehicle meets a further criterion.

8. The method of claim 1, wherein in the reducing, the automated steering torque is reduced in a first reducing interval to a predetermined first target value and to a predetermined second target value in a second reducing interval, the predetermined second target value falling below the predetermined first target value, the second reducing interval following chronologically after the first reducing interval.

9. A device for monitoring a steering action of a driver of a vehicle, comprising:
a torque applying unit to apply an automated steering torque on a steering system of the vehicle;
a torque reducing unit to reduce the automated steering torque, wherein in the reducing, the automated steering torque is reduced by hands of the driver using a piece of information about a suspected non-touching of a steering wheel of the vehicle;
a detection unit to detect at least one of a movement of the steering system, a force of the steering system, and a lateral movement of the vehicle in response to the reduction of the automated steering torque, so as to monitor the steering action of the driver; and
forming the piece of information about the suspected non-touching of the steering wheel of the vehicle by the hands of the driver, the piece of information being formed when an active steering torque executed by the driver is below a predetermined threshold value over the duration of a predetermined time interval;
wherein in the reducing, the automated steering torque is reduced in a first reducing interval to a predetermined first target value and to a predetermined second target value in a second reducing interval, the predetermined second target value falling below the predetermined first target value.

10. A non-transitory computer readable medium having a computer program, which is executable by a processor, comprising:
a program code arrangement having program code for monitoring a steering action of a driver of a vehicle, by performing the following:
applying, via a torque applying unit, an automated steering torque on a steering system of the vehicle;
reducing, via a torque reducing unit, the automated steering torque, wherein in the reducing, the automated steering torque is reduced by hands of the driver using a piece of information about a suspected non-touching of a steering wheel of the vehicle;
detecting, via a detection unit, at least one of a movement of the steering system, a force of the steering system, and a lateral movement of the vehicle in response to the reduction of the automated steering torque, so as to monitor the steering action of the driver;
forming the piece of information about the suspected non-touching of the steering wheel of the vehicle by the hands of the driver, the piece of information being formed when an active steering torque executed by the driver is below a predetermined threshold value over the duration of a predetermined time interval;
wherein in the reducing, the automated steering torque is reduced in a first reducing interval to a predetermined first target value and to a predetermined second target value in a second reducing interval, the predetermined second target value falling below the predetermined first target value.

* * * * *

UNITED STATES PATENT AND TRADEMARK OFFICE
CERTIFICATE OF CORRECTION

PATENT NO. : 10,286,951 B2
APPLICATION NO. : 15/547342
DATED : May 14, 2019
INVENTOR(S) : Chengxuan Fu Page 1 of 2

It is certified that error appears in the above-identified patent and that said Letters Patent is hereby corrected as shown below:

In the Claims

In Claim 1, Column 8, Lines 20-24, replace:
"reducing, via a torque reducing unit, the automated steering torque, wherein in the reducing, the automated steering torque is reduced by hands of the driver using a piece of information about a suspected non-touching of a steering wheel of the vehicle;"

With:
--reducing, via a torque reducing unit, the automated steering torque, wherein in the reducing, the automated steering torque is reduced using a piece of information about a suspected non-touching of a steering wheel of the vehicle by hands of the driver;--

In Claim 9, Column 9, Lines 22-26, replace:
"a torque reducing unit to reduce the automated steering torque, wherein in the reducing, the automated steering torque is reduced by hands of the driver using a piece of information about a suspected non-touching of a steering wheel of the vehicle;"

With:
--a torque reducing unit to reduce the automated steering torque, wherein in the reducing, the automated steering torque is reduced using a piece of information about a suspected non-touching of a steering wheel of the vehicle by hands of the driver;--

In Claim 10, Column 10, Lines 13-17, replace:
"reducing, via a torque reducing unit, the automated steering torque, wherein in the reducing, the automated steering torque is reduced by hands of the driver using a piece of information about a suspected non-touching of a steering wheel of the vehicle;"

With:
--reducing, via a torque reducing unit, the automated steering torque, wherein in the reducing, Signed and Sealed this
Seventeenth Day of September, 2019

Andrei Iancu
*Director of the United States Patent and Trademark Office* the automated steering torque is reduced using a piece of information about a suspected non-touching of a steering wheel of the vehicle by hands of the driver;--